United States Patent [19]

Litzenberg

[11] 4,115,038
[45] Sep. 19, 1978

[54] MOTOR DRIVEN PUMP

[76] Inventor: David P. Litzenberg, 1528 Bryant La., Meadowbrook, Pa. 19046

[21] Appl. No.: 731,302

[22] Filed: Oct. 12, 1976

Related U.S. Application Data

[63] Continuation-in-part of Ser. No. 541,491, Jan. 27, 1975, Pat. No. 3,967,915.

[51] Int. Cl.² .................................................. F04B 17/00
[52] U.S. Cl. ........................................ 417/357; 417/360; 417/365; 417/369; 415/DIG. 3; 417/423 R
[58] Field of Search ............................. 415/219 C, DIG. 3; 417/357, 360, 365, 369, 370, 423 R

[56] References Cited

U.S. PATENT DOCUMENTS

| 2,766,695 | 10/1956 | Gailloud | 417/357 |
|---|---|---|---|
| 2,796,835 | 6/1957 | White | 417/357 |
| 2,830,541 | 4/1958 | Higgins et al. | 417/360 |
| 2,913,988 | 11/1959 | White | 417/357 |
| 2,993,449 | 7/1961 | Harland | 417/357 |
| 3,026,808 | 3/1962 | Immduilli | 417/369 |
| 3,067,690 | 12/1962 | Kramer et al. | 417/357 |
| 3,128,712 | 4/1964 | Sence | 417/357 |
| 3,228,341 | 1/1966 | Hungerford, Jr. | 417/357 |
| 3,264,653 | 8/1966 | Lebuchner | 417/357 |
| 3,967,915 | 7/1976 | Litzenberg | 415/209 |

FOREIGN PATENT DOCUMENTS

| 603,571 | 8/1960 | Canada | 417/369 |
|---|---|---|---|
| 1,049,445 | 12/1953 | France | 417/369 |
| 567,190 | 9/1975 | Switzerland | 417/369 |

Primary Examiner—C. J. Husar
Attorney, Agent, or Firm—Zachary T. Wobensmith, 2nd; Zachary T. Wobensmith, III

[57] ABSTRACT

A motor driven pump is described having an improved and simplified construction of pump casing and impeller with easy adaptability of the components over a wide range of capacity, an improved construction of the motor stator and rotor with structure which is adaptable for selection for use over a wide range of input, improved structure for alignment and support of the motor stator and of the motor rotor from a reference element referred to as a post, and without compounding and piling up of tolerances, and with adequate provisions for cooling and for pressure balancing.

13 Claims, 7 Drawing Figures

MOTOR DRIVEN PUMP

CROSS-REFERENCE TO RELATED APPLICATIONS

This application is a continuation in part of my prior application for letters patent for Motor Driven Pump, filed Jan. 27, 1975, Ser. No. 541,491 and embodies in part structure shown in my U.S. Pat. No. 3,967,915, issued July 6, 1976.

BACKGROUND OF THE INVENTION

1. Field of the Invention

This invention relates to motor driven pumps.

2. Description of the Prior Art

Many designs of motor driven pumps of the type referred to as canned motor pumps, have heretofore been proposed among which are those shown in U.S. Pat. Nos. to White, 2,713,311; 2,741,990; 2,763,214; 2,796,835; 2,906,208; 2,913,988; 3,053,189; 3,111,090; 3,138,105; 3,220,349; 3,220,350 and 3,280,750 and Litzenberg, U.S. Pat. No. 2,871,791.

A canned motor pump is a hybrid device utilizing the arts and techniques required in the design of an electric motor and the arts and techniques required in a hydraulic device, such as a pump, and wherein the design parameters, and other factors are entirely different and unrelated. An electric motor is an extremely close tolerance device with very precise alignment requirements, particularly those that pertain to the air gap between the rotor and stator elements. In addition, the motor efficiency is critically affected by the distance of the air gap between the two parts. Since, in a canned motor pump, shielding is required of the inside of the stator and the stator and the exterior and ends of the rotor with a corrosion resistant metal to protect these parts from the fluid being handled this makes it necessary to increase the air gap from the normal 0.020 inch clearance to an 0.060 inch clearance.

A unit of this type commonly utilizes sleeve bearings of various materials which when new and not worn have clearances of the order of 0.003 inch to provide for a fluid film for bearing lubrication and bearing cooling.

From the foregoing it will be apparent that alignment and close tolerances are of the utmost importance in order to obtain originally the minimal efficient air gap and to provide for wear on the bearings that results from use.

As in any device the standards must be established for the entire device based upon the demands of the most critical portions of the unit. While the hydraulic components do not require the same precision requirements they must be designed, manufactured, and utilized with the same tolerance factors as the motor. In the past, available designs developed and marketed obtained alignment at high cost with service difficulties, in part interchangeability and restricted service life.

The post design herein described solves the limited service life, part interchangeability and critical alignment problems heretofore encountered. In this post design all parts relate to only one part for the tolerance considerations. The post controls all the other parts essentially in a one to one relation so that there are only two tolerances, one is with respect to the post and the other is with respect to any other part to the post without stacking or compounding of the parts with each other and piling up or pyramiding tolerances in each of the parts as they relate to the others.

The U.S. Pat. No. to Sence, 3,128,712 for canned motor pump is illustrative of the pyramiding of tolerances which are avoided with the present invention.

If in Sence the housing 30 can be taken as a starting point and as having a basic tolerance, part 22 (front is assembled, then part 16 is assembled to part 22 (front) and part 22 (rear) is added, both of these in a relationship to the liner 24 and then to these is added part 35 (bearing housing).

While all these parts stem from the bearing housing they are connected in a series arrangement but in no direct relation to the bearing housing 30 except through their tolerances.

From a practical standpoint fine machine tolerances on parts of this type will at high cost have tolerances of at least 0.002 inch so that if all the parts are exact there is a tolerance build up for the five tolerance locations of at least 0.010 inch which causes a misalignment of 50% of the motor air gap. A misalignment of this nature reduces considerably the efficiency of the motor, causes problems in part interchangeability which affects both life performance and field service repairs and reduces considerably the available bearing wear life. While this discussion relates to the motor section it is similarly applicable on the hydraulic side which further compounds the problem.

With the post design herein described and by the use of a unitary motor housing in which the machining can be carried out in a single operation for close control of the tolerances the objectionable pyramiding of tolerances as referred to above is avoided and with bearing alignment and motor rotor air gap simply but effectively obtained and maintained.

The patent to White, U.S. Pat. No. 2,796,835 shows a motor driven pump which, like Sence, has a pyramiding of tolerances in an undesirable fashion.

White at 53 has a fixed solid mandrel which does not permit the continuous flow of a portion of the liquid being pumped for bearing cooling and lubrication and pressure balancing.

Other prior art patents now known also lack any teaching of the post concept and have pyramided tolerances inherent in their structures.

The basic design parameters of all canned motor pumps involve a wet section which contains the fluids being pumped and the elements for that purpose including the motor rotor shaft assembly, impeller and bearings. The dry section is that of the motor stator which is separated from the wet section by a non-magnetic liner or sleeve between the rotor and the stator.

In the previous designs all parts in both the wet and dry sections were interdependent on each other thereby establishing an excessive tolerance build up due to intermingling of the close tolerance requirements of the electric motor components and the greater tolerances in the hydraulic section.

The motor driven pump of the present invention permits of complete divorce of the wet section from the dry section.

The motor driven pump of the present invention, in addition to the advantages referred to is also capable in a single size of accommodating different motor sizes thus reducing the cost of manufacture.

The constructions heretofore employed, also, were not suited for a range of sizes but individual designs of pumps of small range were common practice. It was not considered feasible to use a single design which with minor changes in components, change of pump inlet and outlet sizes, or change of length of the motor stator and/or of the motor rotor, to effect accommodation for a different input, or capacity, or other pump characteristics.

The canned motor pump or motor driven pump of the present invention has other advantageous features. The inboard bearings because of their location in a cylindrical tubular shaft are always in alignment. Better distribution of work loads both hydraulic and electrical is available over the bearings. The bearings can be readily replaced and can be made of the desired length for the load because ample space is available.

A simplified motor driven pump is provided which overcomes many of the shortcomings of the motor driven pumps heretofore available.

SUMMARY OF THE INVENTION

In accordance with the invention a motor driven pump is provided with an improved pump construction including pump housing and pump impeller, and adaptability thereof to desired operating conditions, an improved motor stator and motor impeller with a wide range of selection of capacity by simple changes of components, with improved motor stator support and simplified rotor bearing alignment, with a post construction which avoids pyramiding of tolerances, and with a simple and effective thrust balancing system.

It is the principal object of the invention to provide an improved motor driven pump which can be readily and inexpensively constructed.

It is a further object of the invention to provide a motor driven pump in which an isolating sleeve is interposed between the motor stator and motor rotor and which can be of predetermined length for use with a wide range input of motor stator windings.

It is a further object of the invention to provide an improved motor driven pump employing a post member for locating and aligning the stator housing and the motor stator carried therein and which in turn contributes to maintaining the motor rotor alignment and minimum air gap between the motor rotor and its isolating sleeve.

It is a further object of the invention to provide an improved motor driven pump employing a post member to which the tolerances of the pump and motor components are directly related.

It is a further object of the invention to provide a motor driven pump having improved fluid handling components.

It is a further object of the invention to provide a motor driven pump having improved motor stator and rotor components.

It is a further object of the invention to provide a motor driven pump having improved provisions for maintaining bearing alignment.

It is a further object of the invention to provide a motor driven pump in which the pump can be of simplified construction of pump housing, inlet and delivery connections, and impeller, with capabilities of variation of pump characteristics as desired by change of minor components.

It is a further object of the invention to provide a motor driven pump in which the pump and motor can be constructed to a particular size with accommodation by change of minor components for different sizes and capacities.

It is a further object of the invention to provide a motor driven pump of the character aforesaid with force balancing of the rotor assembly, if desired.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which

FIG. 4 is a fragmentary sectional view of a portion of FIG. 3 with provisions for back flushing;

Figure 1:
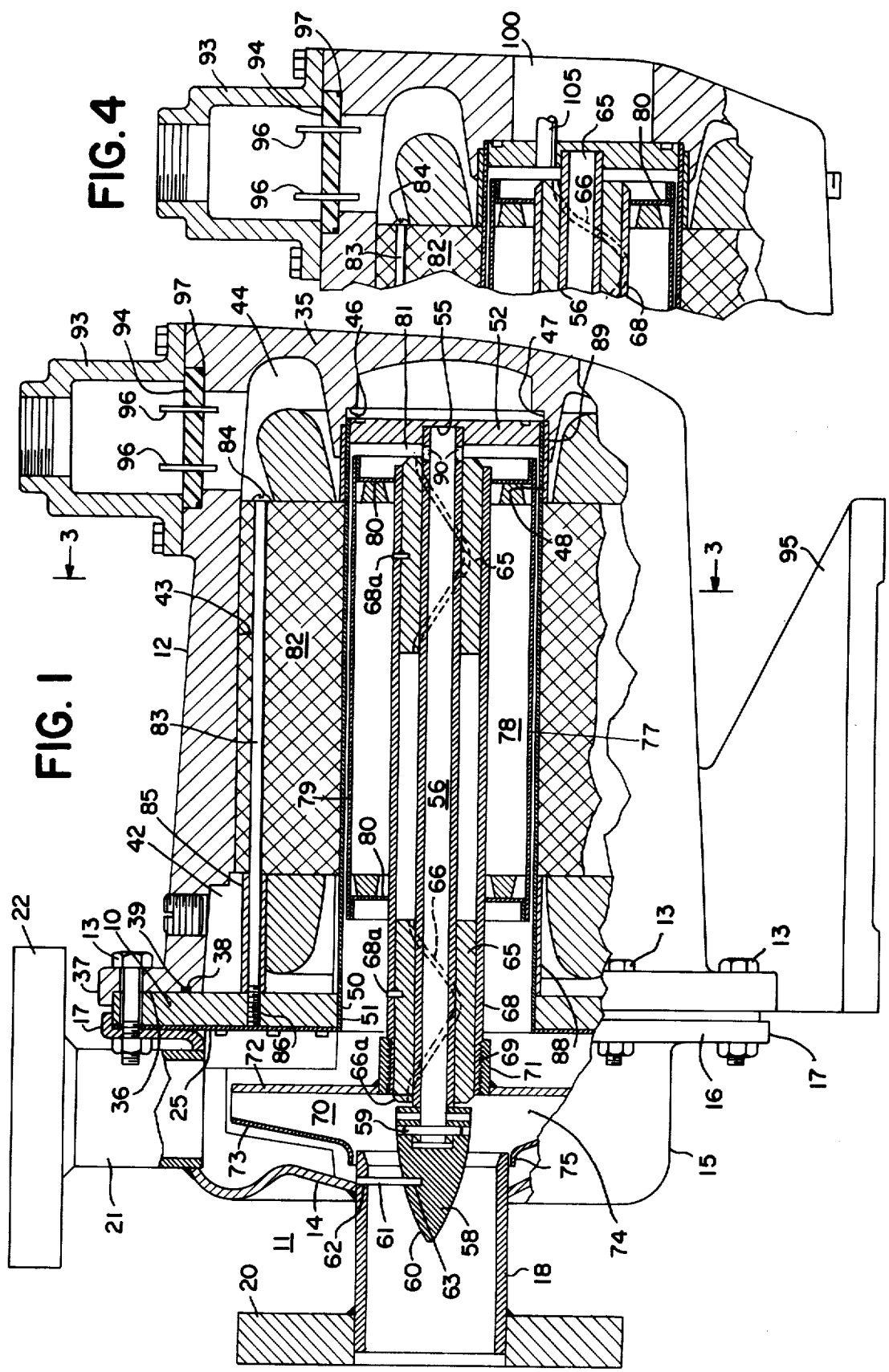
FIG. 1 is a vertical longitudinal central sectional view of a motor driven pump in accordance with the invention.
Figure 2:
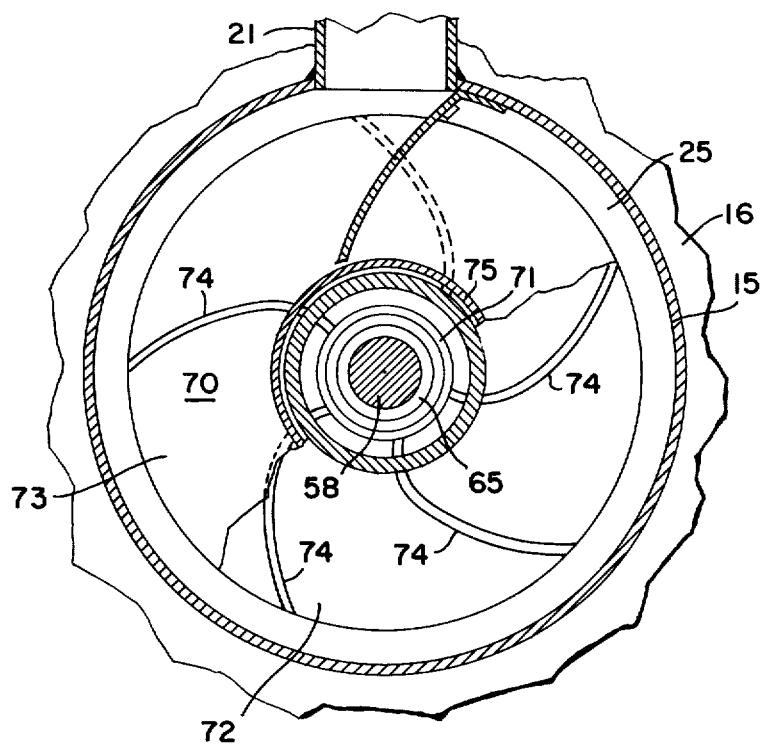
FIG. 2 is a transverse vertical sectional view taken approximately on the line 2—2 of FIG. 1 and with part of the impeller further broken away.
Figure 3:
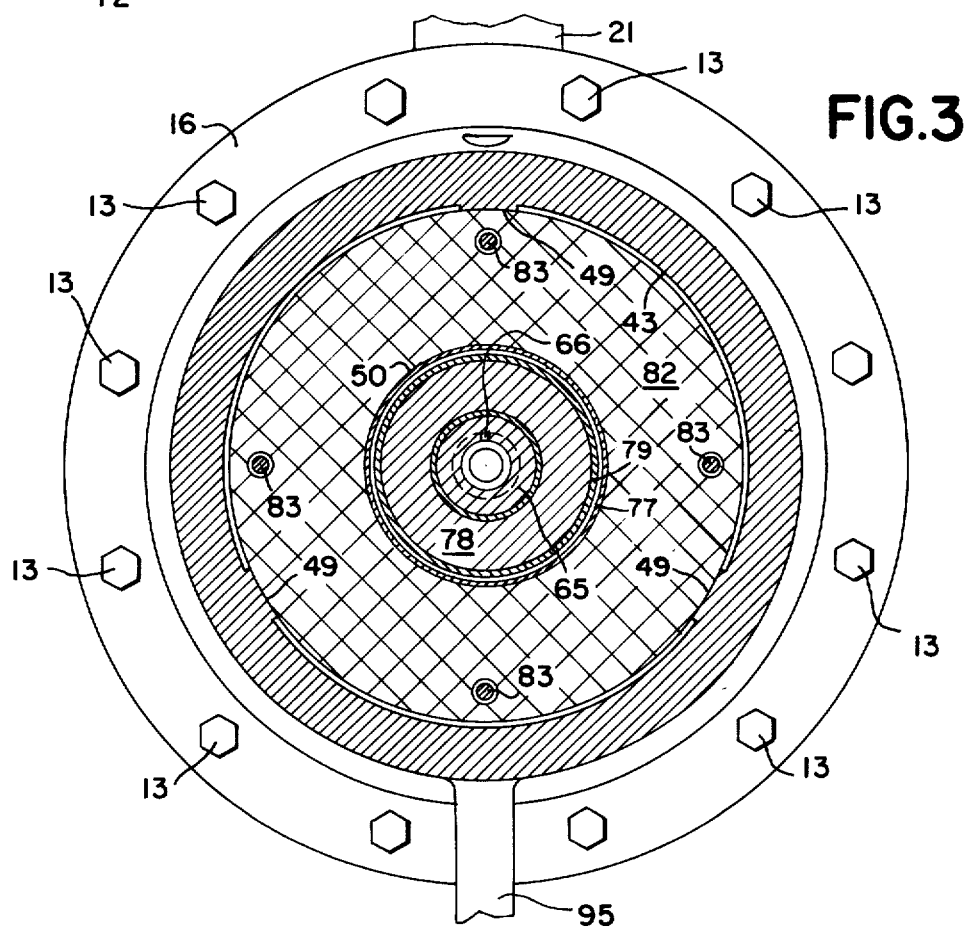
FIG. 3 is a transverse vertical sectional view taken approximately on the line 3—3 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, a post member preferably in the form of a disc 10 is provided to which a pump housing 11 and motor stator housing 12 are secured by bolts 13. The post member 10 is rigid and, as will hereinafter more fully appear, serves as a starting point or reference element and to which all the desired tolerances can be related.

The pump housing 11 can be of any desired type, may be in the form of a volute but is preferably circular in transverse cross section as described in more detail in my application for U.S. letters patent for Centrifugal Pump, filed Jan. 27, 1975, Ser. No. 541,492, now U.S. Pat. No. 3,967,915, issued July 6, 1976, with a dished end wall portion 14, a side wall portion 15 and an attaching flange 16 through which the bolts 13 extend. The flange 16 has a peripheral rim 17 in overlapping relation to the post 10 for positioning of the pump housing 11. The pump housing 11, because of its shape, can be made as a stamping from sheet metal. A longitudinally axially disposed fluid inlet connection 18 is provided secured to the end wall portion 14 with a flange 20 secured thereto, as by welding, for connection to a fluid supply line (not shown).

A radially disposed fluid delivery connection 21 is provided secured to the side wall portion 15 and can have a flange 22 secured thereto by welding for connection to a fluid delivery line (not shown).

A front end shroud 25 is preferably interposed between the flange 16 and the disc 10, in covering and protective relation to the outer face of the post disc 10.

The motor housing 12, which may be made as a generally cylindrical casting with a closed end wall 35, preferably has an end face 36 for engagement with the post disc 10 and an overlapped peripheral rim 37 for positioning and for clamping engagement with the post disc 10. The end face 36 is provided with an end groove 38 for reception of a packing 39, such as an O-ring, to prevent fluid leakage at this location.

The motor housing 12 has a converging interior space 42 from which a cylindrical space 43 extends toward the end wall 35. From the space 43 a space 44 extends to the end wall 35 and a central inwardly extending hollow circular rim 45 is provided. The rim 45 is provided with an inner end shoulder 46, a cylindrical surface 47 and a larger cylindrical surface 48. The machining of the interior of the motor housing 12, as may be seen in FIG. 5, can be carried out in a single operation for close control of the tolerances.

The space 43 is provided with a plurality of pads 49, preferably spaced at 120°.

The post disc 10 has secured thereto an isolating sleeve 50 of non-magnetic responsive material, preferably stainless steel. The shroud 25 preferably is connected to the sleeve 50 which extends through a central opening 51 in the disc 10. The opposite end of the sleeve 50 extends along the surface 47 and is closed by an end closure and rear shaft support plate 52 preferably of stainless steel and welded to the sleeve 50.

The plate 52 has a central socket 55 for receiving the rear end of a fixedly mounted hollow mandrel 56.

The mandrel 56, at the front thereof, is carried in a fluid guiding inlet plug 58 and retained therein by a diametrically disposed pin 59. The inlet plug 58 has an external fluid guiding surface 60 and is preferably supported by a plurality of radial pins 61, three at 120° spacing being preferred, extending through openings 62 in the pipe 18 and into openings 63 in the plug 58.

The fixed mandrel 56 has spaced bearings 65 thereon, which may be of carbon or the like, preferably each with a helical opening 66 along the mandrel 56 for liquid flow for cooling and lubrication. The opening 66 has a slot 66a in the end face for access of liquid to the opening 66.

A hollow tubular shaft 68 to which the bearings 65 are preferably attached by shrinking or by a pin 68a has an impeller 70 of any desired type secured thereto, such as by a collar 71 in threaded engagement with the shaft 68 at 69 and with the impeller 70 in partial overlapped relation to and supported by one of the bearings 65 for stability. The collar 71 is shown as having a shroud plate 72 welded thereto with a spaced shroud plate 73 and interposed vanes 74 secured between the plates 72 and 73. The shroud 73 preferably has a front rim 75 welded thereto and extending over the inner and of the pipe 17. The impeller 70 can be changed in accordance with the desired capacity and/or head characteristics of the impeller 70 or of the viscosity of the fluid to be handled and with a cut water or pump casing tongue 30 corresponding thereto.

The shaft 68 also has secured thereto a motor rotor 78 which is shown as of the "canned" type, enclosed by a cylindrical cover 79 and end plates 80 to shield the motor rotor 78 against contact by the liquid being pumped. The length of the motor rotor 78 can be varied to accord with the desired horse power input.

If it is assumed that the rotor 78 corresponds to a 5 horsepower motor, a shorter rotor of about two thirds of the length could be employed for 3 horsepower or about one third the length for 1 horsepower without changes in the bearings 65, the mandrel 56 and shaft 68, and the sleeve 50, thereby reducing the cost for different motor sizes.

The housing 12, in the space 43, has a motor winding assembly 82 supported on the pads 49 and held in position and against longitudinal axial movement by tie rods 83 having heads 84 and spacers 85. The tie rods 83 have threaded ends 86 engaged in the post disc 10.

The motor winding assembly 82 is preferably of a length in accordance with the length of the motor rotor 78, thus accommodating, for one size of mandrel 56, shaft 58 and sleeve 50, a plurality of sizes of motor components, with attendant cost savings.

The sleeve 50, on the exterior thereof between the end of the winding 82 and the post disc 10, has a protective collar 83, and on the exterior thereof between the winding 82 and the circular rim 45 and for engagement by the surface 48 has a protective collar 89. The protective collars 88 and 89 prevent the internal pressure effective on the isolating sleeve 50 from causing distortion or rupture of the sleeve 50 and the collar 89 provides a support for the rear end of the sleeve 50 and is dimensionally related back to the post 10.

The length of the collar 89 will be determined by and varied in accordance with the length of the winding 82.

A portion of the fluid in the pump housing 11 can pass freely into the interior of the isolating sleeve 50, and to and along the opening 77 provided by the clearance between the motor rotor cover 79 and the sleeve 50 to the space 81 at the right of the motor rotor 78 in FIG. 1, and enter the fluid openings 66 in the bearing 65 at the right and then advance to the left in the space between the bearings 55 and then through the fluid opening 66 in the bearing 65 at the left and return to the pump housing 11 for cooling and for bearing lubrication.

A portion of the fluid in the chamber 81 at the right end of the motor rotor 78 (see FIG. 1) can also enter through orifices 90 in the fixed mandrel 56, move to the left along the interior of the mandrel 56 and return to the pump housing 11 through openings 91 in the mandrel 56 and inlet plug 58. The space 81 within the sleeve 50, at the right of the motor rotor 78 is available to serve as a balancing chamber.

The clearance space 77 between the motor rotor cover 79 and the sleeve 50 serves as a fixed control orifice affecting the pressure within the chamber 81. The ports 90, as partially covered or uncovered by the bearing 65 by longitudinal axial movement of the shaft 68 along the fixed mandrel 56 provide a variable orifice to determine the pressure applied in the chamber 81 on the right end of the motor rotor 78 for balancing.

The housing 12 has a connector housing 93 in holding relation to an insulating and fluid tight connector plate 94. The plate 94 engages and holds a packing ring 97 in fluid tight relation. The plate 94 has conductor pins 96 therethrough for the internal and external connection of electrical leads (not shown) for input to the stator windings 82 which are isolated from the fluid being pumped by the isolating sleeve 50.

The housing 12 can be supported in any desired manner, a base 95 being shown which forms part of the motor housing 12.

The mode of operation will be obvious from the foregoing but may be summarized briefly.

Energization of the fixed windings 82 is effective for rotation of the motor rotor 78 to drive the shaft 68 and the impeller 70 mounted thereon. Fluid entering through the pipe 18 and guided by the inlet plug is delivered by the impeller 70 for delivery through the delivery pipe 21.

The post disc 10 provides a rigid support for attachment of the pump housing 11, and for change to another pump housing if the pump impeller 70 is to be changed. The pump housing 11 is maintained in its desired position by the engagement of the side wall portion 16 and flange 17 with the bolts 13 in secured condition.

The post disc 10 carries the isolating sleeve 50 and the motor stator windings 82 are held in position by the tie rods 83.

Figure 5:
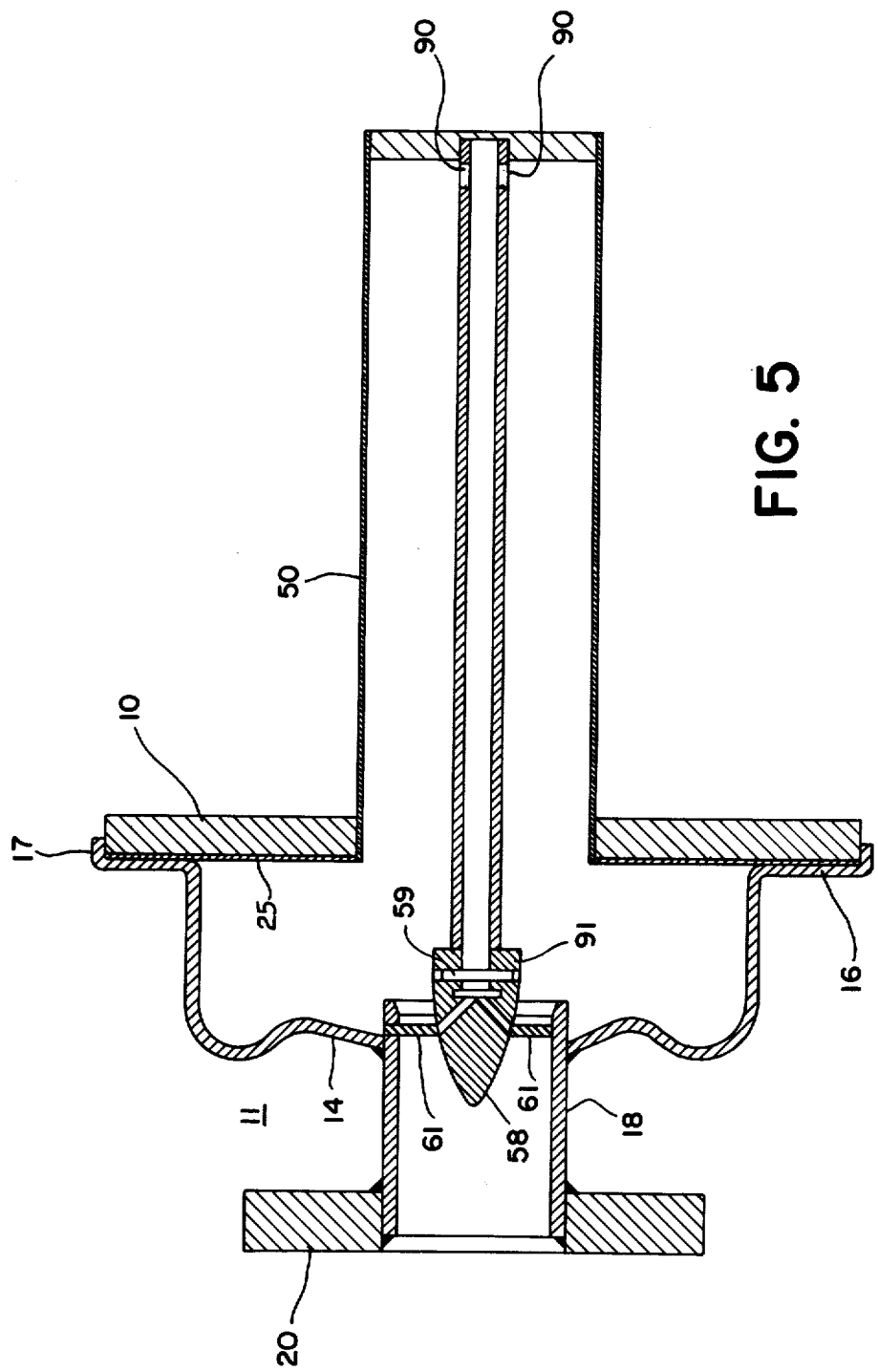
FIG. 5 is a longitudinal sectional view of a separated portion of the structure of FIG. 1 illustrating the separability of the components and the alignment in this portion.

The motor stator housing 12 is maintained in its desired position with respect to the post disc 10 by engagement of the wall face 36, the post disc 10, the rim 37 in overlapped relation to the disc 10 aiding in the proper positioning with the motor stator housing 12 in place, the free end of the isolating sleeve 50 being engaged and held in place by the surface 47. A firm support for the end of the mandrel 56 is thus provided which in turn maintains the alignment of the contiguous bearing 65. The other end of the mandrel 56 is supported by the inlet plug 58. Referring now to FIG. 5 it will be seen that the wet section, containing the hydraulic elements is completely divorced from the dry section. The alignment in this section is permanent and fixed and is not subject to changes from assembly and disassembly due to service problems. The post 10 establishes a fixed close tolerance from point P2, at the location of the flange 16 to the point P3 which is inflexible and unchanging which positively positions the rigid non-rotating mandrel 56 in the front end. Modern machining practices can easily hold the tolerance between the point P2 and the point P3 to a maximum of 0.001 inch. The same applies to the tolerance between point P2 an point P4, the rear mounting location for the non-rotating mandrel 56.

If the volute 15 is removed for servicing and reinstalled it is always restored to its original position and tolerance due to the dominating and controlling reference position of the post 10. This construction provides a rigid low tolerance and unchanging interpost relationship under all conditions and at all times for the containment zone of the hydraulic portion. It is not disturbed nor is any relationship changed either by servicing or by operating conditions. The addition of the stator section of FIG. 6 does not change the alignment of the mandrel 56 which thus provides the foundation for the rotating parts.

The post 10 also provides the positioning and tolerance base for the stator section, i.e., the dry section.

Figure 6:
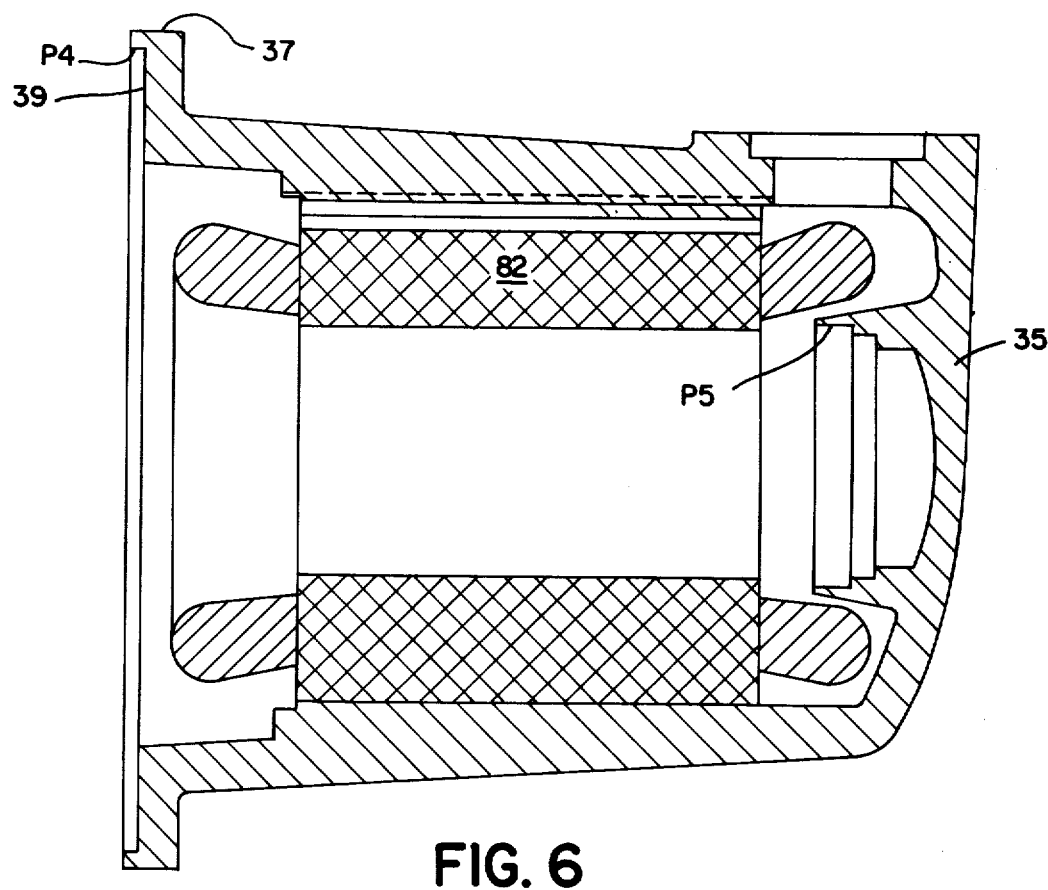
FIG. 6 is a longitudinal section view of another separated portion of the structure of FIG. 1, and specifically the dry section and illustrating the tolerance control.

As can be seen in FIG. 6, the tolerance control between the points P4 and P5 is inflexible and easily controlled by modern machine practice to 0.001 inch. This structure provides all the support for the heavy electrical section without stress, weight or other factors which could cause either misalignment of the operating parts in the wet section or its containment structure (FIG. 4).

The post 10, as can be seen in FIG. 5 is dominating and controlling and provides a part to part relationship which eliminates tolerance buildup. In the event of the occurrence of some unforeseen circumstance which alterances between P4 an P5, the integrated wet section of FIG. 5 would not be affected from an alignment standpoint since that assembly has its own built-in integrity for alignment.

With demonstrated fundamental integrity of both wet and dry sections of the structure based upon the post 10 it will be clear that an unchanging and close tolerance relation is established for the rotating parts of the unit.

In structures of the prior art it has been common practice to position the bearing housings and bearings outboard of the load and usually on other structures of the unit. This has caused problems in the areas of high tolerance build-ups, axial alignment of the bearings and movements of the rotating shaft holding the impeller on one end and the heavy motor rotor in the middle which allows flexing of the driving shaft. Such movements have a detrimental effect upon the air gap tolerance between the rotor 78 and the stator liner or sleeve 50 where a maximum tolerance of 0.015 inch is necessary to maintain electrical efficiency of the motor.

Figure 7:
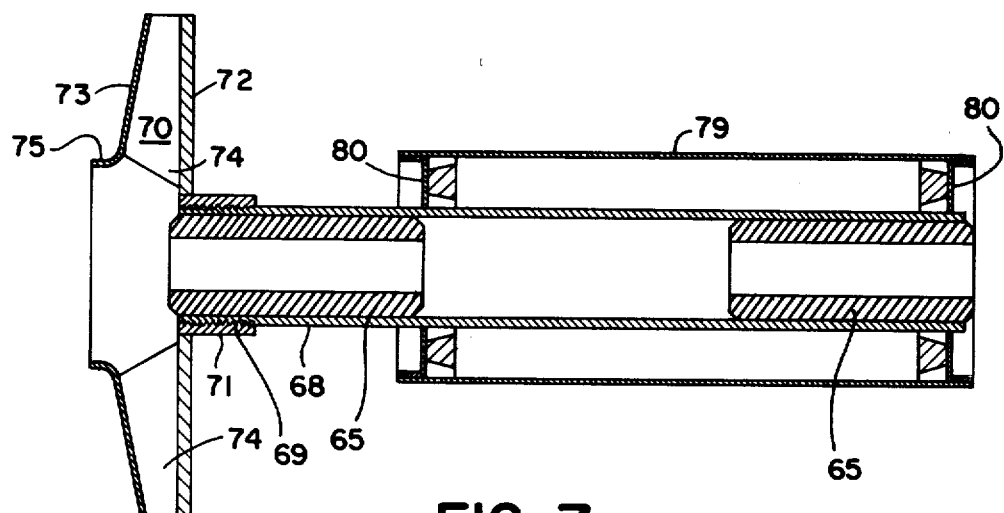
FIG. 7 is a longitudinal sectional view of another separated portion of the structure of FIG. 1 and specifically the impeller, shaft, bearings and motor rotor assembly.

In FIG. 7, a completely integrated rotor, impeller and bearing section is illustrated and from which the impeller 70 can be removed without disturbing the remainder of the integrated assembly.

The only wear parts in the unit are the bearings 65 which must have a diametrical clearance of 0.003 inch to provide for a fluid film to minimize bearing wear. This factor also has an effect on the running clearance between the rotor stator 82 and the stator liner or sleeve 50 which is normally 0.015 inch.

In the unit of the present invention, and unlike the structures of the prior art, the bearing loads are directly over the bearings 65. This avoids deflection of shaft 68 under load which could cause loss of tolerance at the gap 77. This same feature allows an alignment reaming of both bearings 65 to provide an absolute axial surface on both bearings 65 from the front to the rear of the assembly. The linear surface of both bearings is fully utilized to carry the required loads. A longer and more extended service life is thus made available.

The bearings 65 are also provided with grooves 66 for bringing fluid to each bearing 65 for lubricating purposes. It is recognized that bearings 65 wear in service. The bearings 65 can be readily removed and replaced in a minimum of time and without loss of tolerance or alignment.

It is recognized that canned pump motors lack fans or other cooling devices to remove heat from the stator section with attendant reduction of efficiency and shortening of the life of the motor windings 82. In order to alleviate this problem it has been common practice to fill the stator cavity with an electrically compatible fluid. The filling liquid has heretofore usually been trapped at each end, is not free to circulate for cooling and cooling is ineffective.

With the structural arrangement described close tolerances can be provided and maintained under operating conditions with reduction of wear and increase of efficiency.

As previously indicated the structure shown can be utilized for a wide range of inputs by simple changes in components without the necessity for complete changes in the basic structure.

The pump unit can be removed and a different pump unit substituted, the pump units themselves being of simple inexpensive construction.

In FIG. 4 a modified form of the invention is illustrated adapted for the introduction of fluid from the opposite end of the unit to that at which the impeller 70 is located. The end wall 35 is provided with an opening 100 surrounded by a packing ring 101 for engagement with the end closure 52 to prevent fluid leakage. An opening 105 is provided in the plate 52 for connection, if desired, to a source of fluid under pressure (not shown), the fluid being clean fluid from any desired location or fluid tapped from the fluid delivered by the fluid delivery connection 21 and passed through a screen or filter if necessary. The opening 105 may also be employed for pressure testing of the conditions at that location.

The pressure of the fluid delivered through the opening 105 can be utilized for intermittent back flushing or for continuous flow to overcome the pressure of the fluid normally passing in the interior of the sleeve 50 for cooling. This construction is particularly advantageous if the fluid being pumped is a slurry or contains particles which would clog up or cause erosion of the motor rotor cover 79 or sleeve 50 at the clearance space 77.

It will be seen that structure has been provided with which the objects of the invention are attained.

I claim:

1. In combination
   a rigid post member comprising a disc,
   an impeller housing mounted on said post member on one side thereof and positioned thereby and having a fluid inlet connection and a fluid delivery connection communicating with the interior thereof,
   a unitary motor housing mounted on and positioned at one end thereof by said post member on the other side thereof and having a bore at the other end positioned by the mounting of said housing on said post member,
   said motor housing having a motor stator winding therein mounted on and positioned by said post member,
   said post member having a motor stator isolating sleeve positioned thereby and extending therefrom and into said bore in said motor housing interiorly of said motor stator and having an end closure,
   a mandrel fixedly carried at one end in said end closure and at the other end in said impeller housing,
   a shaft rotatably carried on said mandrel,
   a motor rotor carried on said shaft interiorly of said motor stator winding and of said sleeve, and
   a pump impeller in said impeller housing and connected to said shaft in driven relation.

2. The combination definded in claim 1 in which said impeller housing has a rim portion in overlapped and impeller housing positioning relation to said post member.

3. The combination defined in claim 1 in which said motor housing has a rim portion in overlapped and motor housing positioning relation to said post member.

4. The combination defined in claim 1 in which said motor stator winding is mounted by supporting members in engagement therewith and with said post member.

5. The combination defined in claim 1 in which spaced bearing members are provided secured to said shaft, and
said mandrel retains said bearing members in alignment.

6. The combination defined in claim 1 in which the sleeve is of a predetermined length to accommodate a selected one of a plurality of different lengths of motor stators and a corresponding motor rotor in accordance with the desired size of motor.

7. The combination defined in claim 1 in which said motor housing has a closed end,
said sleeve between one end of said motor stator and said post member has an external pressure resistant protective collar, and
said sleeve between the other end of said motor stator and said closed end of said motor housing has an external pressure resistant protective collar.

8. The combination defined in claim 7 in which the length of one of said protective collars is varied to conform to the length of said motor stator for a selected size thereof.

9. The combination defined in claim 1 in which said motor housing has an end closure wall,
said sleeve at its end remote from the post member has an opening in communication with the interior of said sleeve, and
a fluid connection is provided at said end closure wall for delivery of fluid therethrough and through said opening.

10. The combination defined in claim 1 in which said motor housing is in enlosing relation to said sleeve.

11. The combination defined in claim 10 in which said motor housing has a preformed bore at its end remote from said post positioned with said housing with respect to said post member.

12. The combination defined in claim 11 in which said bore is in positioning relation to said sleeve contiguous to said end closure.

13. In combination
a first unit comprising a hollow shaft having
   a pump impeller connected to one end,
   a motor rotor spaced therefrom,
   spaced bearings in said shaft and in supporting relation to said shaft,
a second unit comprising
   a rigid disc post member,
   a pump housing mounted on and positioned by said post member,
   a sleeve carried by said post member and extending therefrom and from said impeller housing and having an end closure,
   a fixed mandrel mounted at one end in said pump housing and at the other end in said sleeve end closure,
a third unit comprising
   a motor housing having motor windings mounted therein with one end of said housing for engagement with the post member and the other end closed and having a portion for reception of the sleeve,
   said first unit being adapted to be mounted on said mandrel of said second unit, and
   said third unit being adapted to be assembled with said one end in engagement with the post member and with said sleeve carried in said end wall of said motor housing.

* * * * *